July 17, 1923.
H. C. H. WALSH
GANG DIE PRESS
Filed Dec. 9, 1920
1,462,094
8 Sheets-Sheet 2
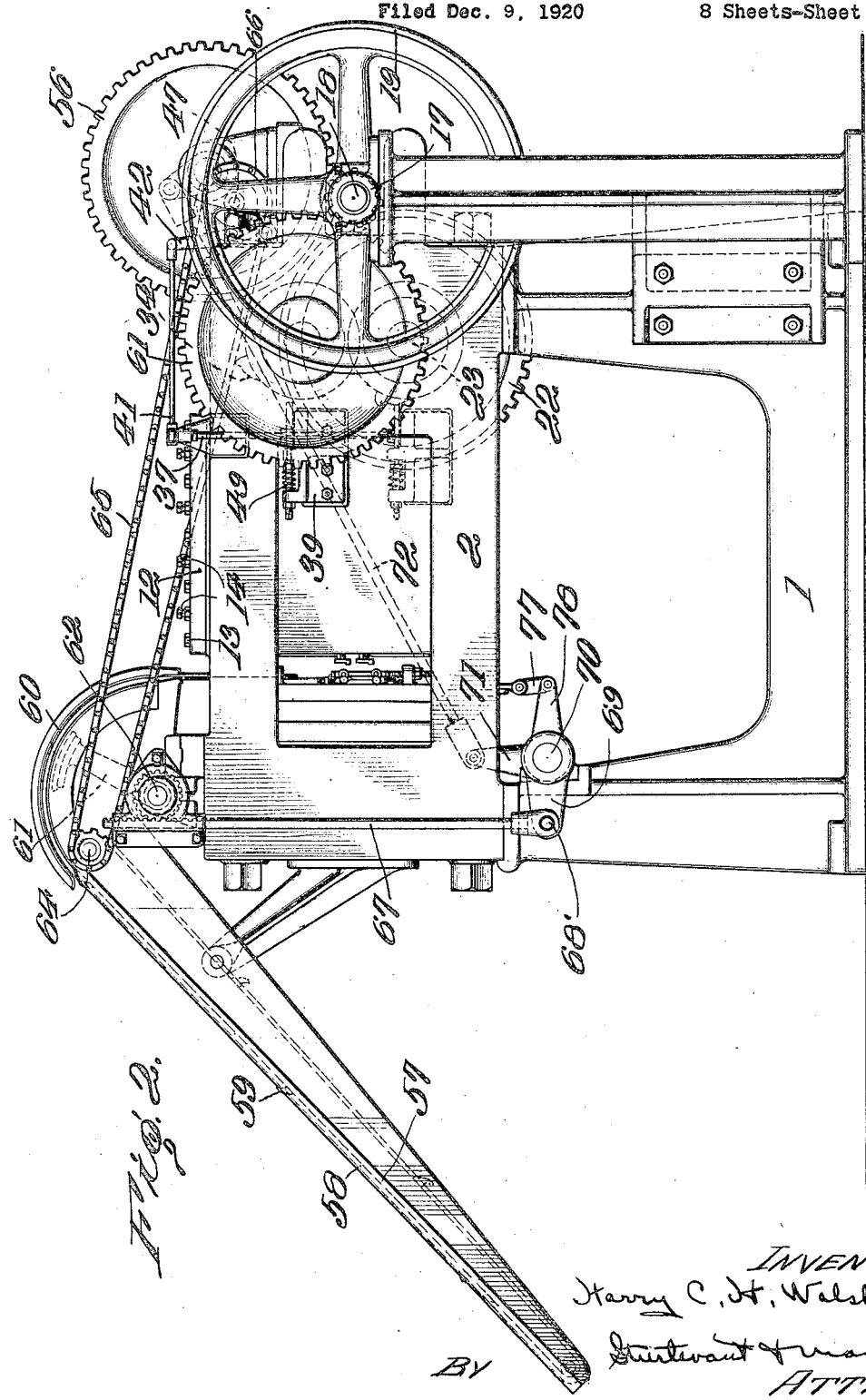
INVENTOR
Harry C. H. Walsh
BY Sturtevant & Mason
ATTYS.

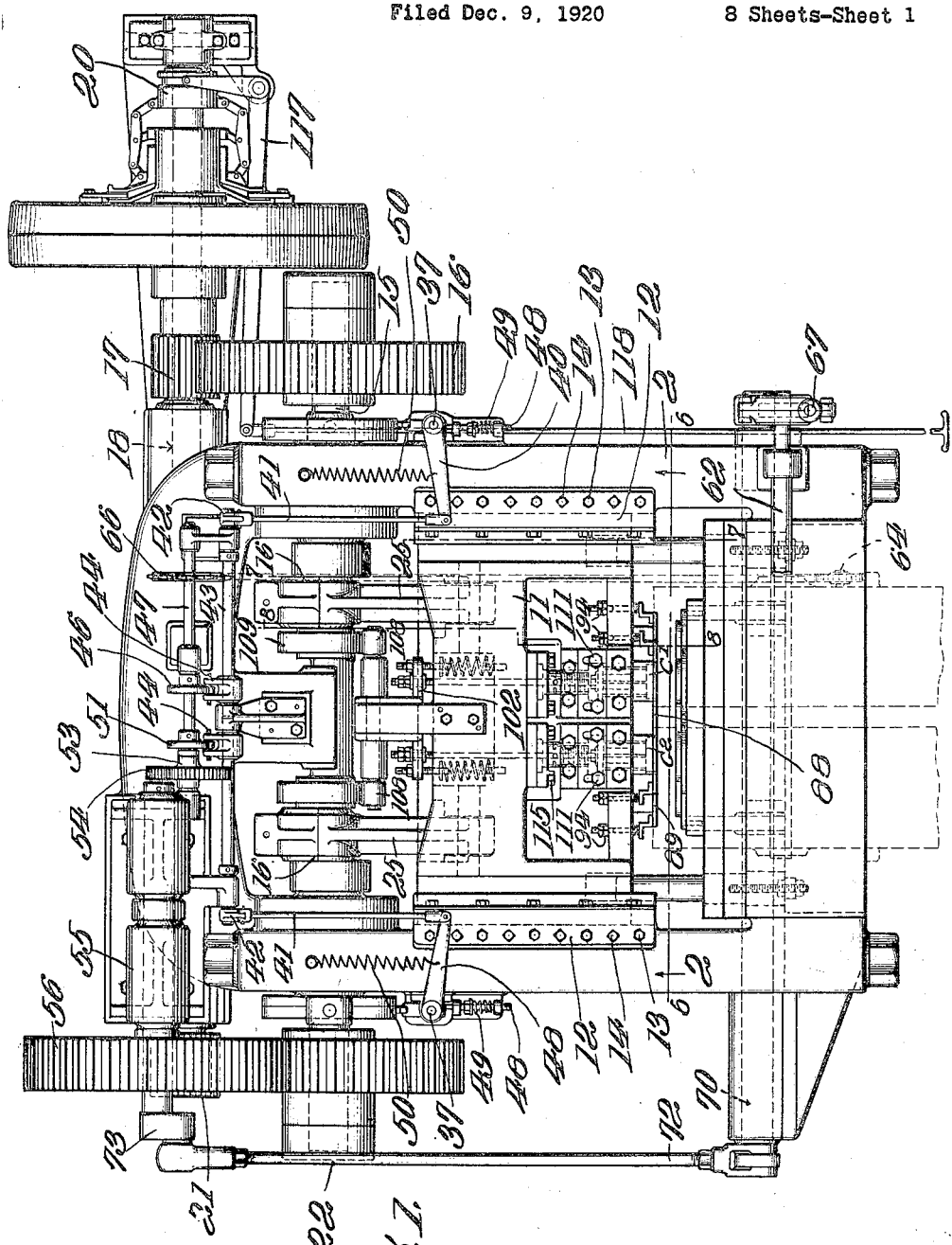

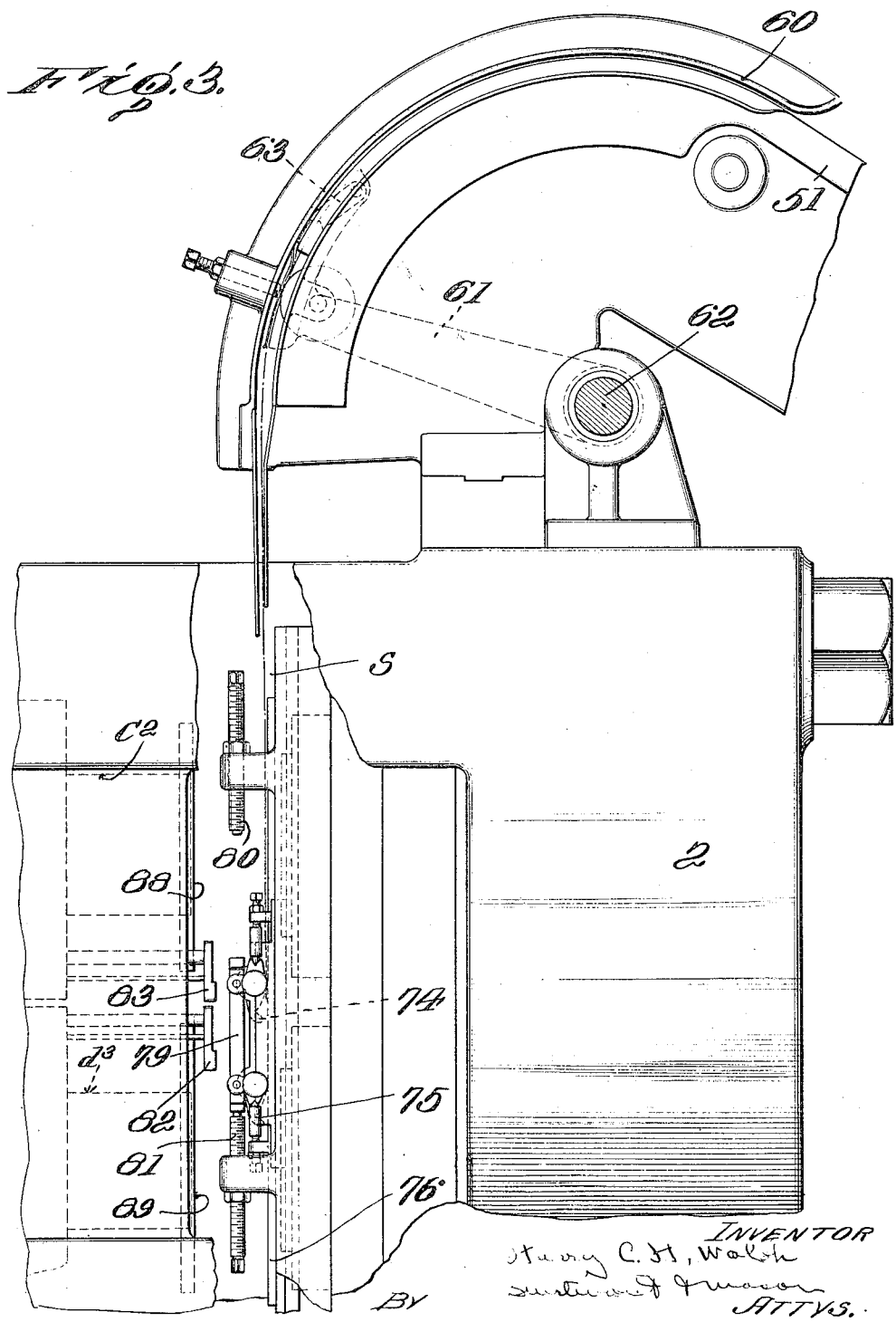

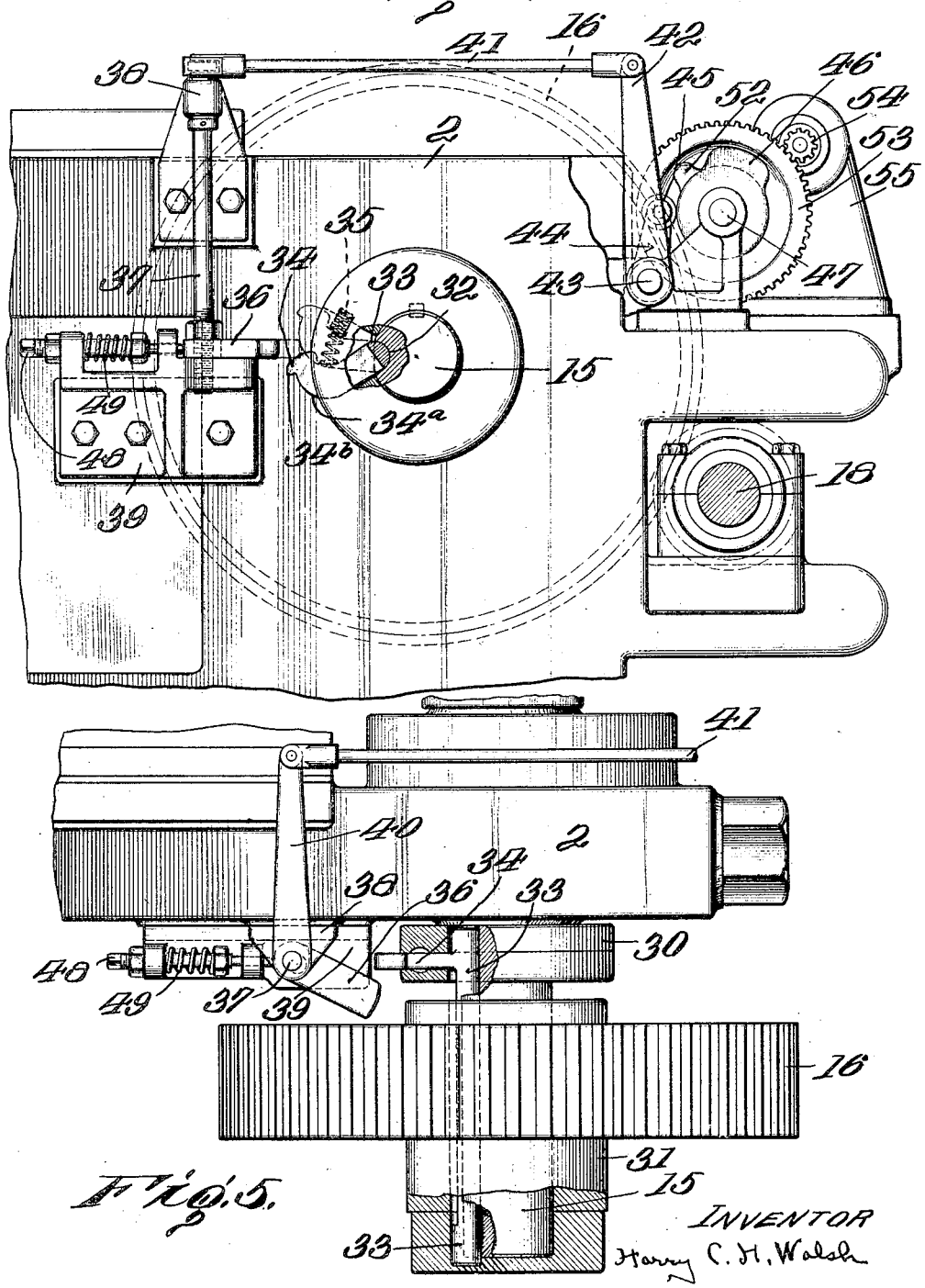

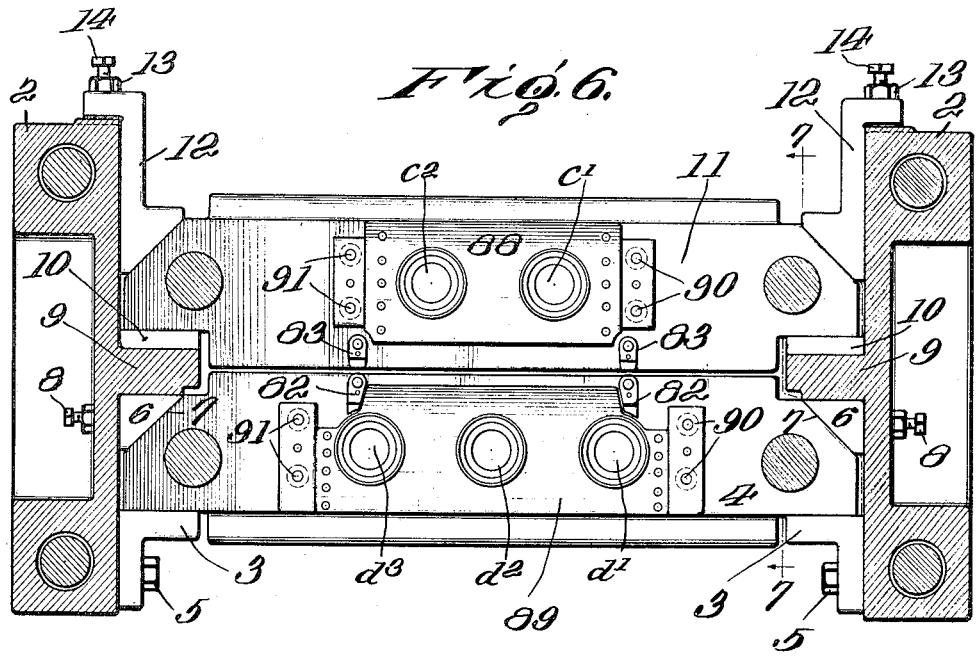

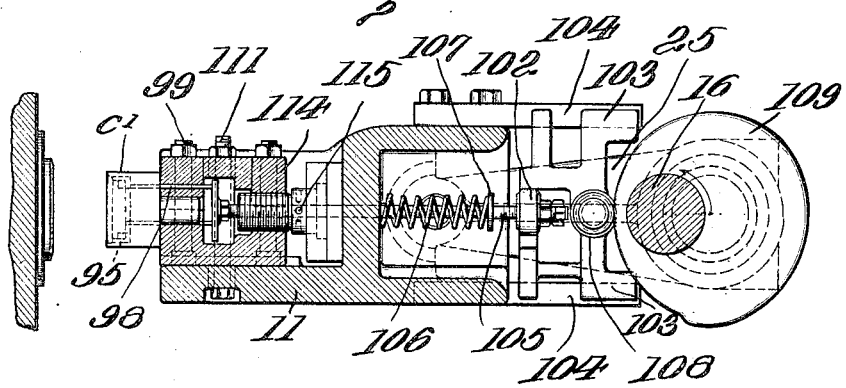
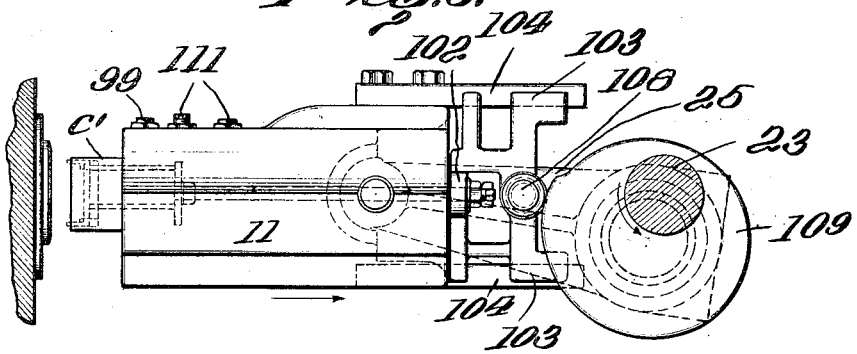
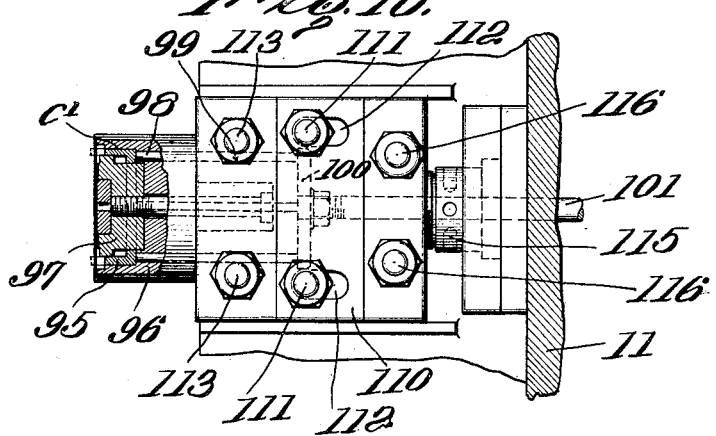

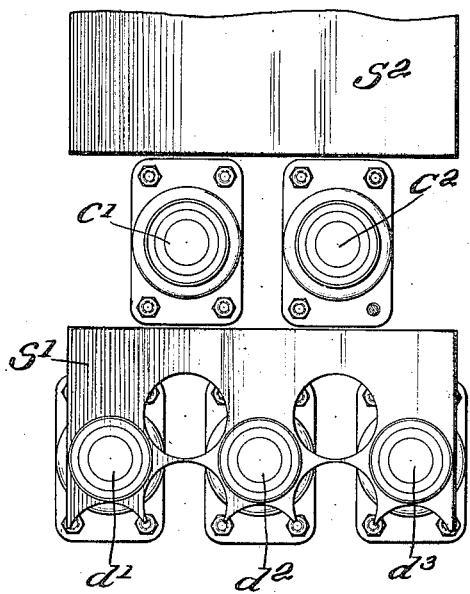
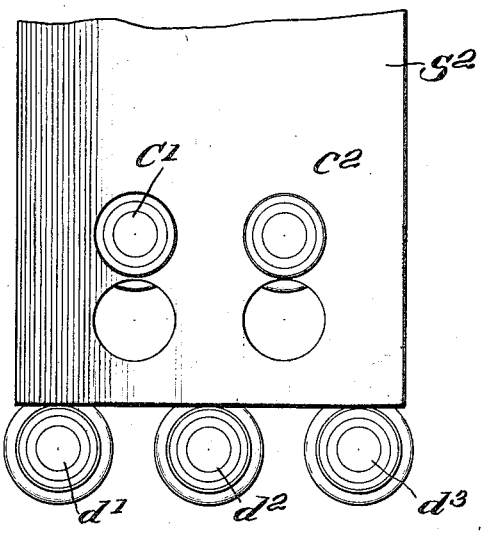
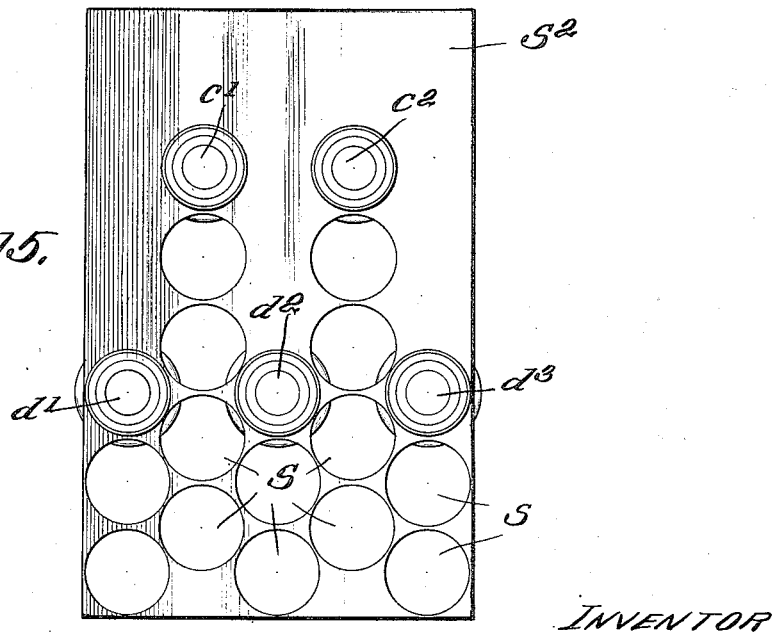

July 17, 1923.
H. C. H. WALSH
GANG DIE PRESS
Filed Dec. 9, 1920  8 Sheets-Sheet 8
1,462,094
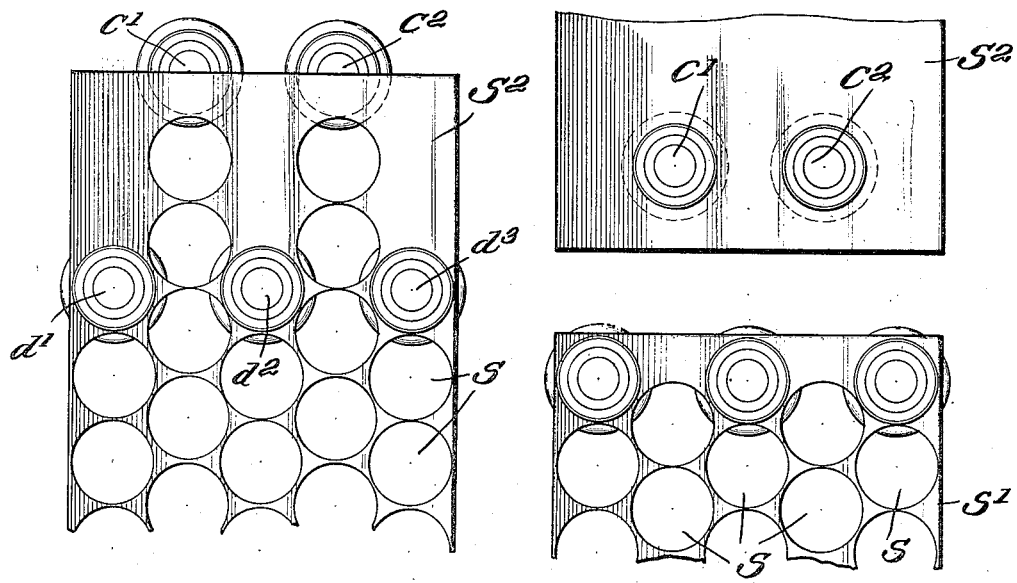
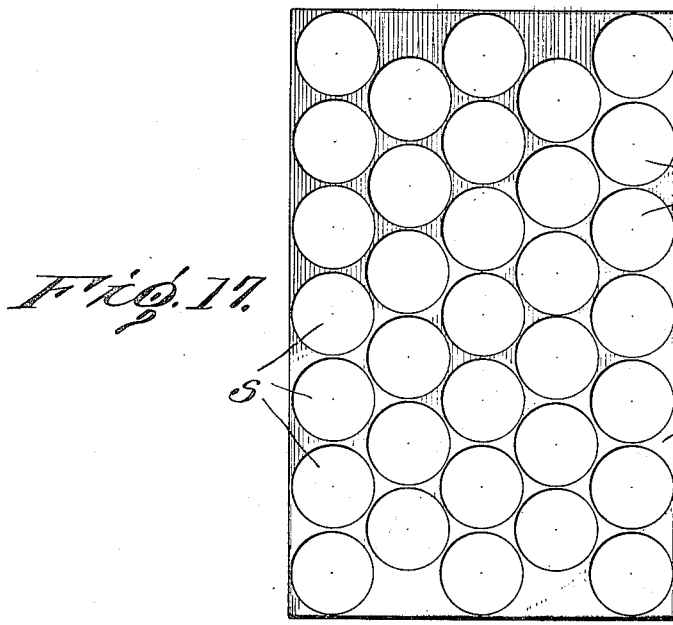
INVENTOR
Harry C. H. Walsh
By Sturtevant Mason
ATTYS.

Patented July 17, 1923.

1,462,094

UNITED STATES PATENT OFFICE.

HARRY C. H. WALSH, OF CHICAGO, ILLINOIS, ASSIGNOR TO CONTINENTAL CAN COMPANY, INC., OF SYRACUSE, NEW YORK, A CORPORATION OF NEW YORK.

GANG DIE PRESS.

Application filed December 9, 1920. Serial No. 429,395.

*To all whom it may concern:*

Be it known that I, HARRY C. H. WALSH, a citizen of the United States, residing at Chicago, in the county of Cook, State of Illinois, have invented certain new and useful Improvements in Gang Die Presses, of which the following is a description, reference being had to the accompanying drawing and to the figures of reference marked thereon.

The invention relates to new and useful improvements in die presses, and more particularly to a gang die press for cutting round blanks or can ends from a sheet of tin.

In my prior Patent No. 1,288,316, granted December 17, 1918, I have shown and described a gang die press wherein the gang dies operate upon a sheet of tin for cutting a series of can ends in staggered arrangement relative to each other. The sheet of tin is fed, step by step, through the gang of dies. In this machine, means is shown for trimming the ends of the sheet preparatory to the operation of the gang die press thereon, and also justifying means for finally positioning the sheet so as to insure that the idle dies, that is, the dies which are not operating to cut can ends from the sheet, will escape the edge of the sheet.

An object of the present invention is to provide a machine in which this preliminary trimming of the sheet and the accurate justifying means for positioning the sheet, are entirely done away with, and a staggered arrangement of can ends cut from a sheet of tin by a reciprocating gang of dies, which sheet of tin is of the commercial form as received from the tin mill.

A further object of the invention is to provide a gang die press in which the dies are arranged abreast or in parallel rows and staggered in said rows so as to cut from the sheet a staggered arrangement of can ends, and wherein means is provided so that the movement of the dies in either row may be suspended at the proper time to prevent a die from cutting a partial blank or can end from the sheet.

A still further object of the invention is to provide a machine of the above character wherein the suspending of the movement of the dies is automatically accomplished by the machine.

A still further object of the invention is to provide a machine of the above type wherein strippers are provided for stripping the cut formed can ends from the dies, which strippers move bodily with the dies, and wherein the movement of the strippers is suspended with the suspending of the movement of the dies.

A still further object of the invention is to provide a machine of the above character wherein the strippers move bodily with the dies and have a movement independent of the dies.

A still further object of the invention is to provide a gang die press wherein the dies are all similarly shaped and operate to cut and form a can end and wherein each die is independently mounted so that it may be adjusted and properly set relative to the die member cooperating therewith.

These and other objects will in part be obvious and will in part be hereinafter more fully disclosed.

In the drawings which show by way of illustration one embodiment of the invention—

Figure 1 is a plan view of a gang die press embodying my improvements, the feeding mechanism being omitted for the sake of clearness;

Fig. 2 is a side view of the same, the operating clutch for the main drive wheel being omitted for the sake of clearness;

Fig. 3 is a view on an enlarged scale, and partly in section and with parts broken away to show the feeding mechanism for presenting the sheets to the gang of dies;

Fig. 4 is a detail view, partly in section and partly in side elevation showing one of the automatic releasing devices for suspending the movements of one of the cross heads carrying one set of dies;

Fig. 5 is a view partly in section and partly in plan showing the automatic release for the clutch connecting one of the reciprocating cross heads to its operating mechanism;

Fig. 6 is a sectional view on the line 6—6 of Fig. 1;

Fig. 7 is a sectional view on the line 7—7 of Fig. 1;

Fig. 8 is a sectional view on the line 8—8 of Fig. 1;

Fig. 9 is a view partly in section and partly in side elevation, showing the sliding head for the strippers and the cam for operating the same;

Fig. 10 is a detail view, partly in plan and partly in section on an enlarged scale showing the manner of supporting and adjusting one of the die cutting and forming members;

Fig. 11 is an enlarged detail showing the manner of yieldingly supporting the presser members;

Fig. 12 is a view showing more or less diagrammatically a gang of dies with a sheet just about to be positioned for the final action for the lower row of dies and for the initial action of the upper row of dies on the next succeeding sheet, at which operation the movement of the upper row of dies is suspended.

Fig. 13 is a view showing more or less diagrammatically a gang of dies, and the final operation on one sheet and the first operation on the following sheet, which operations take place at the same time;

Fig. 14 shows the next operation of the upper dies during which the movement of the lower row of dies is suspended;

Fig. 15 is a similar view but showing both rows of dies in action for cutting the sheet, the sheet being fed, step by step through the die press;

Fig. 16 is a similar view but showing the upper row of dies as having finished their last cut on the sheet and the action thereof suspended while the lower row of dies are still operating to cut can ends from the sheet, and Fig. 17 is a view showing the scrap metal after the complete cutting of the sheet.

In my prior patent referred to above, I have shown and described a gang die press wherein the dies are arranged in two rows abreast, and the sheet is fed, step by step, to the dies. The dies are all continuously reciprocated during the cutting of the sheet, and in order to prevent a die from cutting a partial can end, or cutting into the sheet on any stroke where it does not completely cut and form a can end, the sheet is prepared by trimming the ends of the sheet and a very delicate feeding mechanism is provided which not only feeds the sheet with accuracy, step by step, but which positions the sheet after it has been fed a step movement so as to insure that the dies in one row which have the idle movement, while the other row is active, will escape the edge of the sheet. This preparing of the sheet by trimming, and the accurate feeding and positioning of the sheet, is both expensive and more or less difficult to keep in satisfactory operating condition. The present invention is directed broadly to a gang die press which is capable of operating upon commercial sheets as received from the tin mill, and without any preliminary trimming of the sheet, and which is also capable of cutting a staggered arrangement of can ends from the sheet, which of course, is well known to be the most economical method of cutting the sheet. This is accomplished in the present machine by arranging the dies in two rows or abreast, that is, the rows are at right angles to the direction of feed of the sheet through the press. The dies in the two rows are carried by independently mounted and operated cross heads. These cross heads are actuated by mechanism automatically controlled from the machine, so as to move together for cutting and forming certain of the can ends from the sheet, and so that one of the cross heads is idle at certain times, and then the other is idle at certain times. These idle times in the respective cross heads occur when the sheet is so positioned that the die, if operated, would cut a partial can end, that is, overlap the edge of the sheet, and therefore, the sheet may be cut by feeding it, step by step, to the dies, and a staggered arrangement of can ends cut from the sheet without any injurious effect upon the dies, as they are not called upon at any time to cut while overlapping the edge of the sheet.

A brief description of the arrangement of the dies and the operation thereof on the sheet will possibly facilitate an understanding of the structure of the entire machine. In Figures 12 to 17, inclusive, I have shown more or less diagrammatically a commercial sheet of tin and the arrangement and operation of the dies thereon. The sheet is indicated at $S$ and the spaces from which can ends have been cut and formed are indicated at $s$. In Figures 12 to 16, inclusive, the lower row of dies is indicated at $d^1$, $d^2$, $d^3$, while the upper row of dies are indicated at $c^1$, $c^2$. In Fig. 12, the sheet $S'$ is presented to the lower row of dies $d^1$, $d^2$, $d^3$ at next to the last operation thereon. At this time, the dies $c^1$, $c^2$ are well above the upper edge of the sheet $S'$ and the movement of the upper cross head is suspended. I have also shown in this figure a sheet $S^2$ which is about to be fed into the machine for the operation of the dies $c^1$, $c^2$ thereon. In Fig. 13 the sheet $S'$ has been positioned for the last operation of the dies $d^1$, $d^2$, $d^3$ thereon, and the sheet $S^2$ is positioned for the operation of the dies $c^1$, $c^2$ thereon.

During the next operation of the machine, the scrap metal of the sheet $S'$ drops from the machine and the sheet $S^2$ is fed forward another step for the dies $c^1$, $c^2$ to operate thereon. At this position of the sheet, the dies $d^1$, $d^2$, $d^3$ are very close to the forward edge of the sheet, and with an untrimmed sheet, the dies are likely to overlap the edge of the sheet, if the sheets are extra long. Means is provided in the machine therefore, for suspending the movement of the cross head carrying the dies $d^1$, $d^2$, $d^3$, at this time when the dies $c^1$, $c^2$ are performing their second cutting operation on the sheet $S^2$. Both sets of dies then combine to operate upon the sheet as indicated in Fig. 15 until the sheet reaches the position indicated in Fig. 16, where it will be noted, the dies $c^1$, $c^2$ overlap the rear or upper edge of the sheet. At this time, the movement of the upper cross head is suspended so that these dies $c^1$, $c^2$ do not cut the sheet. The movement of the upper cross head is suspended during two reciprocations of the lower dies, so that the upper dies are idle as to movement when the sheet is positioned as in Fig. 16, and also when as positioned in Fig. 12. It will thus be seen that I have provided an arrangement of dies and a manner of operating the same wherein a staggered arrangement of can ends are cut and formed from a commercial sheet of tin and without any preliminary trimming of the sheet, and without, at any time, a die cutting the sheet while overlapping the edge thereof.

With this brief description of the arrangement of the dies, and the results accomplished thereby, I will now describe in detail my preferred form of machine, it being understood, of course, that the details of construction may be readily varied without departing from the spirit of the invention which will be pointed out in the claims.

My improved gang die press is in general of the same type of construction as that shown and described in my prior Patent No. 1,288,316. The sheet of metal passes in a vertical direction through the machine as it is presented to the gang of dies. Said machine consists of a supporting frame 1 having side members 2, 2. Mounted to reciprocate on suitable guides 3, 3 is a cross head 4 which carries the dies $d^1$, $d^2$, $d^3$. The guides 3, 3 are bolted by suitable bolts 5, 5, to the side frames 2. This cross head 4 is held on the guides 3, 3 by wedge-shaped guide rails 6, 6. These guide rails are also bolted to the side frames 2, 2. The cross head has inclined surfaces 7, 7 which are engaged, respectively, by these guide rails 6, 6. Suitable bolts 8, 8 bear against these guide rails 6, 6 and may be used to shift the position of the guide rails to take up wear. Under the adjustable guide rails 6 are ledges 9, 9 which are preferably formed as a part of the side frames 2, 2. On these ledges are guide bolts 10, 10, and on the guide bolts 10, 10 rests the upper cross head 11 which carries the dies $c^1$, $c^2$. The upper cross head is guided by adjustable guide rails 12, 12 which are held in place by bolts 13, 13 and adjustable bolts 14 which pass through the guide rails and bear against the upper parts of the frame members 2, 2.

Mounted in the frame members is the upper shaft 15 which carries a gear wheel 16, and this gear wheel in turn meshes with a gear wheel 17 on the main driving shaft 18. This main driving shaft 18 carries a belt wheel 19 which is preferably free on the shaft and connected thereto by any suitable friction clutch mechanism, such as shown for example at 20 in Fig. 1 of the drawings. The main shaft 18 extends through the machine and carries at its other end a gear wheel 21 which meshes with a gear wheel 22 on the lower shaft 23. The upper shaft 15 is used for reciprocating the upper cross head 11, and the lower shaft 23 is used for reciprocating the lower cross head 4. The shaft 15 is provided with two offset cranks 24. Connected to these cranks in the usual manner are links 25, 25. These links in turn are pivoted at 26 to the upper cross head 11. The lower shaft is provided with offset cranks 27 and links 28 which are pivoted at 29 to the lower cross head 4. (See Fig. 7.) As these shafts 15 and 23 rotate, they will reciprocate the cross heads through these operating links and the cross heads carrying the dies, as above described.

As a means for suspending the movements of the cross heads at the times above stated, I have provided clutch mechanism for connecting the shafts 15 and 23 with their respective operating mechanisms. In Figures 1, 4 and 5, I have shown in a general way, one form of clutch mechanism for accomplishing this result. The gear wheel 16 is mounted so as to rotate freely on the shaft 15. Fixed to this shaft 15 is a collar 30. The gear wheel 16 is provided with a hub 31. The shaft 15 has a segment groove 32 formed therein in which is located a segment clutch rod 33. This segment clutch rod is provided with an arm 34. A spring 35 bearing against the arm 34 normally forces the same to the full line position shown in Fig. 4. When in this position, this segment clutch rod 33 will be moved partially out of the segment groove 32 in the shaft, and as the clutch rod extends into the hub 31 of the gear wheel 16, it will thus lock the gear wheel 16 to the shaft 15, and the rotation of the gear wheel 16 will then impart rotation to the shaft 15. When the arm 34 is moved to the dotted line position shown in Fig. 4, then the segment clutch rod will be housed within the segment groove in the shaft 15 and the hub 31 can turn freely on the shaft. Mounted in the frame of the machine is an arm 36. Said arm is fixed to a vertical shaft 37 mounted in a fixed bearing 38 at its upper end, the lower end of the shaft extending into the elongated slot in the bracket plate 39. At the upper end of the shaft 37 there is another arm 40 which is connected to a link 41, and this link 41 is in turn connected with an arm 42 on the rock shaft 43, which rock shaft carries a second arm 44 in which is mounted a roller 45 adapted to engage the face cam 46 on a shaft 47. When the enlarged portion of the face cam 46 rocks the shaft 43, the arm 36 will be moved into the path of the arm 34 which is rotating bodily with the shaft 15. This arm 34 is provided with a bellied portion $34^a$ which engages the end of the arm 36 and it is this cam action of the bellied portion $34^a$ that turns the arm 34 to release the gear wheel 16 from the shaft 15. The shaft 17 is capable of springing slightly as the lower end thereof is more or less loosely mounted, and this stops the shaft 15 without any sudden jar. The nose $34^b$ of the arm 34 finally contacts with the upper face of the arm 36, but not until the momentum of the shaft has been really stopped.

A rod 48 is forced by the spring 49 against the rear end of the arm 36. This rod 48 is mounted in suitable bearings in the bracket 39, and means is provided for adjusting the tension of the spring 49. This serves to take up any shock and assists the spring of the shaft in holding the arm 36 up to its working position in connection with the clutch member of arm 34.

From the above it will be apparent that the shaft operating the upper cross head carrying the dies $c^1$, $c^2$ will be disconnected from its operating mechanism through the action of the clutch releasing mechanism which is controlled by the cam 46, and the time which elapses while the upper cross head is released and during which the movements thereof are suspended, will depend upon the shaping of the cam 46. As soon as the cam projection passes the roller 45, a suitable spring 50 will move the lever 36 so as to disconnect it from the arm 34, and then the spring 35 will operate to cause the gear wheel 16 to be clutched to the shaft 15. On the opposite side of the machine there is a similar clutch mechanism for connecting the gear wheel 22 to the shaft 23, and similar parts have been similarly numbered. The roller 45 carried by the arm 44 connected with this clutch member for the gear wheel 22 is, however, operated upon by a cam 51 having a cam projection 52 which is shaped so as to bring about one suspension in the movement of the lower cross head as compared with two suspensions of the movements of the upper cross head. The shaft 47 on which the cams 46 and 52 are mounted is provided with a gear wheel 53 which meshes with a gear wheel 54 on a shaft mounted in suitable brackets 55 and carrying a gear wheel 56 which in turn meshes with a gear wheel on the main shaft 18.

From the above it will be apparent that I have provided a gang die press having an upper and a lower cross head, which are positively reciprocated by means of offset cranks upon separate driving shafts, and that these driving shafts are capable of being connected to and disconnected from the main actuating shaft, and that said connecting and disconnecting means is controlled respectively by cams actuated from the machine, so that the machine automatically reciprocates the cross heads and suspends the reciprocations of the cross heads for given periods of time. Thus the result described in detail above in the cutting of a sheet of tin is accomplished. It is to be understood, of course, that these controlling cams may be otherwise shaped for suspending the action of the cross heads at different times and for different periods of time to accomplish results desired.

The sheets to be cut are laid or fed, one at a time, on an inclined table 57. Running over this inclined table is a feed chain 58 provided with spaced dogs 59 against which the sheet is placed, and these dogs carry the sheet up the inclined table 57 and into the curved guideway 60. An arm 61 is secured to the shaft 62 and this arm is provided with a dog 63 which engages the end of the sheet and feeds the same through the curved guideway 60 and positions the sheet for the first operation thereon of the upper die $c^1$, $c^2$. This feeding mechanism is very similar to that shown in my prior Patent No. 1,288,316, and further detail description thereof is not thought necessary. The shaft 64 which operates the feed chain 58 is actuated in the present machine by a sprocket chain 65 which runs over a suitable sprocket on the shaft 64 and also over the sprocket 66 on the shaft 47. The shaft 62 is oscillated by means of a rack bar 67 which is provided with a rack at its upper end meshing with the pinion on the shaft 62. This rack bar is pivoted at 68' to an arm 69 attached to a shaft 70. This shaft 70 has a second arm 71 which is connected to a link 72, and the link 72 at its other end is connected to a crank 73 on the shaft driven by the gear wheel 56. (See Fig. 1.) As this shaft rotates the crank 73 gives the link 72 an endwise movement and this will rock the shaft 70 and reciprocate the rack bar 67.

The sheet is fed, step by step, through the machine by gripping feed dogs 74 and 75. These feed dogs are pivotally carried by a bar 76 which is connected by a link 77 to an arm 78 on the shaft 70, so that as the shaft 70 oscillates, the bar 76 is raised and lowered. The gripping feed dogs are pivotally carried by this bar, and are of the construction shown in my prior Patent No. 1,288,316, so that the dogs are held either in gripping position or released position. The two dogs are connected by means of an operating bar 79 which comes into contact with adjustable screws 80 and 81. When the bar 76 moves upwardly, the dogs will be actuated by the adjustable screw 80 so as to be thrown into gripping position to grip the sheet. The downward movement of the bar 76 feeds the sheet one step. The dogs are then actuated by an adjustable screw 81 so as to release the sheet and remain out of contact with the sheet during the upward movement of the bar 76. The feed stroke is therefore determined by the position of the adjustable screws 80 and 81, and not by the length of the stroke of the bar 76. Cooperating with these gripping feed dogs are presser members 82 and 83. As clearly shown in Fig. 6, there are two members 82 and two members 83. These are all similar in construction. Each consists of a presser foot 84 carried by a rod 85 which extends through a threaded sleeve 86. On the inner end of the rod 85 is a collar 86$^a$ which limits the outward movement of the presser foot away from the cross head. A spring 87 yieldingly forces the presser foot outwardly to the extreme of its movement. When the cross head moves forward with the dies for the punching operation, these yielding presser feet move into contact with the sheet and hold the sheet, and while the sheet is so held, the gripping feed dogs move upwardly for their next feeding movement. The presser feet are held from lateral movement by a guide rod 85$^a$ freely moving in the guideway in the cross head. When the cross heads move away from the sheet, these presser feet will hold the sheet for a sufficient time to allow the dogs to grip the sheet, and then they release the sheet a sufficient time for the feed dogs to feed the sheet. Inasmuch as first one cross head and then the other is idle as to its reciprocating movements, I have provided a second pair of presser feet, so that one pair will always be in action to cooperate with the feed dogs in the holding and the feeding of the sheet.

As a means for stripping the sheets from the dies, I have provided a stripper plate 88 for the upper pair of dies $c^1$, $c^2$, and a stripper plate 89 for the lower pair of dies $d^1$, $d^2$, $d^3$. These stripper plates are similar, except for shape, to each other, and are similarly mounted. At each end of each stripper plate there is a pair of rods 90, 91 which slide in recesses in the cross heads. Surrounding each rod is a spring 92 which normally forces the stripper plates outwardly. A rod 93 is rigidly connected at each end to the support for the stripper plate, and this rod extends through the front flange plate of the cross head as clearly shown in Figure 1 of the drawings. A nut 94 on the inner end of this rod 93 limits the outward movement of the stripper plates so that the stripper plates stand in front of the dies and have openings therein through which the dies move. These stripper plates yield so that when the cross head moves forward causing the die to cut and form a can end, the stripper plate comes against the sheet, after which it yields to allow the dies to perform their operation, and upon the retracting movement of the dies the stripper plate will force the sheet or rather the scrap metal of the sheet off from the dies.

As a means for stripping the formed can ends from the dies, I have provided a stripper ring for each die, which is shown in detail in Figure 10 of the drawings. This stripper ring is indicated therein at 95. Said die consists of an outer portion 96 and a center portion 97 which is secured to the outer portion by means of the bolt 98. The stripper ring lies between these two portions and is moved forward by three rods indicated at 99. These three rods are connected to a head 100, and this head 100 is in turn connected to a rod 101. The rod 101 at its outer end is connected to a slide 102. Said slide is provided with guiding members 103 which form guideways adapted to engage guide plates 104, 104. At each side of the sliding head 102, there is a rod 105 on which is a spring 106. This spring bears at one end against the cross head, and at the other end against a collar 107 secured to the rod 105. The springs normally force the sliding heads carrying the rods 101 outwardly. There is, of course, a separate rod for each die, and there is also a sliding head associated with the cross head carrying the upper dies, and the sliding head associated with the cross head carrying the lower dies. On each sliding head 102 is a pair of rollers 108. These rollers are adapted to engage respectively, cams 109. The cams 109 are concentric to the center of the cranks 24 and 27, respectively, which operate the cross heads so that these cams move bodily with the cranks and of course, rotate with the cranks. The cams are so shaped that when the cross head moves forward, the stripper ring may be housed within the die and the die will perform its function of forming and shaping the can end. When, however, the cross head moves outwardly after the die has performed its function, then the eccentric portion of the cam comes into play to force the slide 102 inwardly and thus strip the can end from the die.

From the above it will be apparent that the stripper moves bodily with the cross head carrying the dies, and has an independent stripping motion, and this is brought about through mounting the operating cam on the crank which reciprocates the cross head. Furthermore, when the movement of the cross head is suspended, the movement of the stripper is also suspended.

It will be noted that the dies for forming the can ends are all similar in construction and that the die shapes the metal as well as cuts the metal, so that the well-known commercial can end having a plurality of concentric corrugations with a partially turned flange is formed. It is very essential therefor, that the dies should all be set so as to properly cooperate with the fixed die associated therewith so as to not only cut but properly shape or form the can end. Heretofore this has been accomplished by guiding the dies in a gang die press. I have provided means, however, in my present machine, whereby each movable die may be adjusted relative to the cross head which carries it. This supporting means for the dies consists of upper and lower blocks 110. These blocks are secured to the cross head by two bolts 111 which pass through slots 112 in the blocks. The bolts 113 clamp the two blocks together and clamp the shank of the die thus serving as a means for securing the die to the blocks. The die is shouldered so as to rest against the ends of the blocks. Secured to the cross head is an adjusting bolt 114 which is provided with a recessed collared head 115 which serves as a means for turning the bolt 114. This head 115 is secured to the cross head so that it cannot move endwise in the cross head, but may be freely rotated on the cross head. The two blocks 110 have threaded portions which engage this threaded adjusting bolt and clamping bolts 116 serve as a means for causing the blocks 110 to firmly grip the adjusting bolt. By loosening the bolts 111 and the bolts 116, and turning the adjusting screw, the entire head, that is, the die and the blocks 110, may be shifted endwise, and when the die is properly set, then the nuts are drawn down on the bolts and the head clamped firmly in the adjusted position.

The clutch 20 for controlling the main driving shaft is operated by means of the lever 117 and the hand rod 118.

The operation of the machine will be clear from the above description, and may be briefly stated as follows:—The sheets are placed one after the other, on an inclined table and the machine started. This is all that the operator is required to do. The sheets are carried up along the table, are engaged by an oscillating arm, and fed to a position where the first pair of dies, that is, the dies in the upper cross head engage the sheet and cut and form can ends therefrom. The feed dogs then grip the sheet and feed it forward one step, that is, the distance between the centers of can ends punched by the same set of dies, plus the width of the scrap metal left in the cutting operation. The cross heads then move forward again to cut another set of can ends. The presser feet engage the sheet as the dies retract and hold the sheet until the feed dogs have completed their return stroke, and then grip the sheet for the next step feeding movement, and so the sheet is fed, step by step, until it has entirely passed through the machine and has been completely cut, leaving only scrap material such as indicated in Fig. 17. When a set of dies overlaps the edge of the sheet, automatically the machine operates to suspend action of the cross head so that the dies are idle as to movement and therefore, no die ever cuts a partial can end, and at the same time, the sheet is taken without any preliminary trimming, but as it comes from the tin mill.

It is obvious that other arrangements of dies may be used, and other arrangements of cutting the sheet may be followed. The essential feature of the invention consists in so controlling the sets of dies that the operating cross head carrying the die is idle as to movement when the die overlaps the edge of the sheet from which the ends are being cut. While I have described the invention as being particularly adapted to the cutting and shaping of can ends, it will also be understood that it may be readily applied for the cutting of other articles. It is also obvious that minor changes in the details of construction may be made without departing from the spirit of the invention as set forth in the appended claims.

Having thus described the invention, what I claim as new and desire to secure by Letters Patent, is:—

1. A die press comprising a gang of similarly formed dies, means for reciprocating said dies, means for feeding a sheet step by step to said dies, and means for suspending the movements of any one of said dies when the same overlies the edge of the sheet.

2. A die press comprising a gang of similarly formed dies, means for reciprocating said dies, means for feeding a sheet step by step to said dies, and automatic means for suspending the reciprocating movement of any one of said dies overlying the edge of the sheet while the remaining dies continue to reciprocate.

3. A gang die press comprising two rows of similarly formed dies, independent means for reciprocating the rows of dies, means for feeding the sheets step by step to said dies, and means for suspending the reciprocating movements of either of the rows of dies when the dies therein overlie the edge of the sheet.

4. A gang die press comprising two independently reciprocating cross heads, a plurality of dies carried by each cross head, means for feeding a sheet step by step to the dies, and means for suspending the movements of the cross heads at predetermined times.

5. A gang die press comprising two independently reciprocating cross heads, a plurality of dies carried by each cross head, means for feeding a sheet step by step to the dies, and automatic means for suspending the reciprocating movements of the cross heads when the dies therein overlie the edge of the sheet.

6. A die press comprising reciprocating cross heads, a plurality of dies carried by each cross head and arranged in staggered relation to each other, means for feeding a sheet step by step to the dies, and means for suspending the movements of the cross heads when the dies therein overlie the edge of the sheet.

7. A die press comprising similarly formed dies, means for reciprocating said dies, means for feeding a sheet step by step to said dies, yielding means for stripping the sheet from the dies, means for stripping the articles formed by the dies from the movable dies, and means for suspending the reciprocating movements of any of the dies overlying the edge of the sheet while the remaining dies continue their reciprocations.

8. A die press comprising two horizontally reciprocating cross heads, dies carried by said cross heads and arranged in staggered relation to each other so as to cut from a sheet of metal a staggered arrangement of can ends, means for feeding the sheet step by step in a vertical direction to the dies, and automatic means for suspending the movements of the cross heads when the dies therein overlie the edge of the sheet.

9. A die press comprising two reciprocating cross heads, a plurality of dies carried by each cross head, means for independently reciprocating the cross heads, and automatic means for suspending the reciprocating movements of one cross head while the other cross head continues to reciprocate.

10. A die press comprising two cross heads, two parallel shafts, means for rotating the shafts, means operated from the respective shafts for reciprocating the cross heads, a plurality of dies carried by each cross head, and automatic means for suspending at predetermined times the rotating movements of the shafts operating the cross heads.

11. A die press comprising two cross heads, two parallel shafts, means for rotating the shafts, means operated from the respective shafts for reciprocating the cross heads, a plurality of dies carried by each cross head, automatic means for suspending at predetermined times the rotating movements of the shafts operating the cross heads, said dies on the cross heads being staggered relative to each other, and means for feeding the sheet step by step to said dies.

12. A die press comprising two reciprocating cross heads, a rotating shaft associated with each cross head, and means actuated thereby respectively for reciprocating the cross heads, a main shaft, means for independently connecting the main shaft to the two shafts including clutch members, and automatic means operated by the main shaft for releasing said clutch members at predetermined times whereby the movements of the cross heads are suspended.

13. A die press comprising two reciprocating cross heads, a shaft associated with each cross head, each shaft having cranks formed therein and links connecting the cranks with the cross heads, a main shaft, means including a clutch for connecting each rotary shaft with the main shaft, cams operated by the main shaft, and devices controlled by the cams for releasing the clutches whereby the reciprocating movements of the cross heads may be suspended at predetermined times.

14. A die press comprising two reciprocating cross heads, a shaft associated with each cross head, each shaft having cranks formed therein and links connecting the cranks with the cross heads, a main shaft, means including a clutch for connecting each rotary shaft with the main shaft, cams operated by the main shaft, devices controlled by the cams, for releasing the clutches whereby the reciprocating movements of the cross heads may be suspended at predetermined times, a stripper for each die, a sliding member associated with each cross head for actuating the respective strippers, and cams carried by said cranks for actuating said sliding members.

15. A die press comprising two reciprocating cross heads, a shaft associated with each cross head, each shaft having cranks formed therein and links connecting the cranks with the cross heads, a main shaft, means including a clutch for connecting each rotary shaft with the main shaft, cams operated by the main shaft, devices controlled by the cams for releasing the clutches whereby the reciprocating movements of the cross heads may be suspended at predetermined times, a stripper for each die, a sliding member associated with each cross head for actuating the respective strippers, cams carried by said cranks for actuating said sliding members, said sliding members having rollers bearing on said cams, and spring means for retracting the sliding member and holding the rollers in engagement with the cams.

16. A die press comprising a supporting framework, two horizontally reciprocating cross heads mounted therein, two horizontal shafts, one above the other, each having cranks formed therein, and links for operating with the cranks and connecting with the respective cross heads for reciprocating the same, a plurality of dies carried by each cross head and arranged in staggered relation to each other, means for feeding the sheet step by step to the dies, a main shaft, means including clutch members for connecting the main shaft to each shaft associated with the cross heads, and means operated by the main shaft for releasing said clutch members at predetermined times for disconnecting the cross heads from their reciprocating shafts.

17. A die press comprising a supporting framework, two cross heads arranged one above the other and movable horizontally, a plurality of dies carried by each cross head, said dies being staggered relative to each other, independent means for reciprocating the cross heads, automatic means for suspending the reciprocating movements of the cross heads at predetermined times, means for feeding the sheets to the dies including a table, travelling means for feeding the sheets along said table, a curved guideway receiving the sheets from the table and directing the same into a vertical path of travel, an oscillating arm for feeding the sheets along said curved guideway, and means for feeding the sheets step by step to the dies.

18. A die press comprising a plurality of dies reciprocating horizontally, means for feeding the sheets step by step to said dies, in a vertical direction including two pairs of reciprocating feed dogs, adjustable means for engaging and moving the dogs into engagement with the sheets, adjustable means for engaging and moving the dogs out of engagement with the sheets, and oscillating presser members movable with the dies for engaging and holding the sheets while released by the feed dogs.

19. A die press comprising a gang of dies, means for supporting and reciprocating said dies horizontally, means for feeding the sheets step by step to said dies including a plurality of gripping feed dogs, a sliding bar at each side of the sheet on which said feed dogs are pivotally mounted, yielding means for holding the dogs in engagement or out of engagement with the sheets, a bar connecting the feed dogs, adjustable means adapted to engage the ends of said bar upon the movement of the feed bar in one direction to cause the feed dogs to grip the sheet and for engaging the bar attached to the feed dogs when moved in the other direction for causing said feed dogs to release the sheet.

20. A die press comprising a gang of dies, means for supporting and reciprocating said dies horizontally, means for feeding the sheets step by step to said dies including a plurality of gripping feed dogs, a sliding bar at each side of the sheet on which said feed dogs are pivotally mounted, yielding means for holding the dogs in engagement or out of engagement with the sheets, a bar connecting the feed dogs, adjustable means adapted to engage the ends of said bar upon the movement of the feed bar in one direction to cause the feed dogs to grip the sheet and for engaging the bar attached to the feed dogs when moved in the other direction for causing said feed dogs to release the sheet, and yielding presser members adapted to engage the sheets and hold the same while released by the feed dogs.

21. A die press comprising two cross heads, a plurality of dies carried by each cross head, a yieldingly mounted stripper plate carried by each cross head for stripping the sheets from the dies, means for feeding the sheets step by step to the dies, yielding presser feet carried by each cross head for engaging the sheets and holding the same while the feeding means is on its idle movement, and means for suspending the movements of the cross heads at predetermined times.

22. A die press comprising a gang of similarly formed dies, a reciprocating cross head carrying said dies, means for adjustably supporting each die on said cross head and for clamping said die in adjusted positions, a screw connected to the cross head so as to be free to rotate thereon but held from endwise movement, said screw being connected to said die so that the turning of the screw will positively move said die from one adjustable position to another.

23. A die press comprising a gang of similarly formed dies, a reciprocating cross head carrying said dies, means for connecting each die with the cross head whereby it may be adjusted endwise, said last named means including a supporting block for the die, a screw having threaded engagement with the block and connected to the cross head so as to be free to rotate but held from endwise movement relative to the cross-head, whereby the rotation of the screw will positively move the block carrying the die back and forth, and means for clamping the supporting block for the die in adjusted position on the cross head.

24. A die press comprising a plurality of reciprocating cross heads, a plurality of dies carried by each cross head, a shaft associated with each cross head, means operated by the respective shafts for reciprocating the cross heads, a main shaft, a clutch dog and means operated thereby connecting the main shaft with each rotating shaft associated with the cross heads, an arm movable into the path of the dog for releasing the same, a shaft supporting said arm, said shaft for supporting said arm being free to move laterally for gradually retracting the movement of the shaft when disconnected from the main operating shaft, yielding means opposing the lateral movements of the shaft carrying said arm, and cam means for oscillating said shaft at predetermined times for suspending the movements of the cross heads.

In testimony whereof I affix my signature.

HARRY C. H. WALSH.